(12) United States Patent
Quick, Jr.

(10) Patent No.: US 6,260,147 B1
(45) Date of Patent: Jul. 10, 2001

(54) WIRELESS SUBSCRIPTION PORTABILITY

(75) Inventor: Roy Franklin Quick, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/666,735

(22) Filed: Sep. 20, 2000

Related U.S. Application Data

(63) Continuation of application No. 09/178,192, filed on Oct. 23, 1998, now Pat. No. 6,178,506.

(51) Int. Cl.$^7$ ........................................................ H06F 1/24
(52) U.S. Cl. .......................... 713/182; 713/164; 713/165
(58) Field of Search .................................. 713/151, 164, 713/165, 167, 182, 183

(56) References Cited

U.S. PATENT DOCUMENTS 6,175,743 * 1/2001 Aplerovich et al. ................ 455/466
6,175,922 * 1/2001 Wang .................................. 713/182

* cited by examiner

Primary Examiner—Thomas R. Peeso
(74) Attorney, Agent, or Firm—Philip R. Wasworth; Maryanne E. DeAngelo; Thomas R. Rouse

(57) ABSTRACT

A short Personal Identification Number (PIN) is used to transfer a subscription for wireless service to a new wireless terminal 104, thereby providing enhanced personal mobility to the subscriber. The transfer is rendered secure by the exchange of Diffie-Hellnan Encrypted Key Exchange (DH-EKE) messages 110, 114.

21 Claims, 2 Drawing Sheets

WIRELESS SUBSCRIPTION PORTABILITY

CROSS REFERENCE OF APPLICATION

This is a continuation application of U.S. Pat. No. 6,178,506, issued Jan. 23, 2001, entitled "WIRELESS SUBSCRIPTION PORTABILITY."

TECHNICAL FIELD

This invention relates to wireless voice and data systems, and has particular relation to allowing a subscriber to move his subscription from one wireless terminal to another. The invention thus provides subscription portability, sometimes also called personal mobility.

BACKGROUND ART

A wireless terminal (portable telephone, laptop computer, etc.) cannot be used as such unless its user has subscribed to a wireless communications service, so that the terminal may use that service to communicate with other terminals, both wireless and wireline. This in turn requires the service provider to register and provision that terminal, that is, to recognize that terminal as being entitled to service and to program the terminal with identification and security information that allows it to access the wireless service.

In the wireless service industry the term "registration" has several meanings. Herein the term "registration" will be used to mean an exchange of the information needed to establish the identity of the user of a terminal and to permit access to wireless services.

This registration may be required in two situations. First, when the terminal is originally purchased, it is not registered to anyone. This situation is referred to as initial provisioning. Second, a subscriber may choose to re-register, that is, to transfer his subscription from one wireless terminal to another. This re-registration might be, for example, from his portable telephone to his laptop computer, or from his regular portable telephone to the portable telephone which he has just rented on a trip to a distant city. This re-registration is referred to as subscription portability.

In early wireless systems such as the analog Advanced Mobile Phone Systems (AMPS), provisioning is performed manually by trained personnel at a terminal distribution site. One of these employees manually registers the terminal with the service provider, typically over the landline telephone. The employee enters information into the terminal through the keypad, using secret information which the service provider has made available to him/her, and storing the subscription information permanently in the terminal. This arrangement is expensive because the seller must have extensively trained employees at every retail outlet. Furthermore, the process is not secure, since the secret information is readily available to these employees.

One alternative means for dealing with both initial provisioning and subscription portability is to provide to the user a separate, removable device known as a user identification module (UIM). The service provider provisions identity and security information into the UIM before distributing it to the user. When the user inserts the UIM into a terminal, the terminal reads the necessary identity information from the UIM and thereby acquires the identity of the user's subscription. This means is popular in the Global System for Mobiles (GSM) system. Registering the terminal after insertion of the UIM is an over-the-air process, and involves a three-way transfer of information between the module, a base station operated by the service provider (which has a unique identification number), and the wireless terminal itself (which has a unique Electronic Serial Number, or ESN).

This first alternative means is still not entirely satisfactory. It requires an electronic interface between the module and the wireless terminal and this interface adds cost to the terminal. Further, the interface is open to contamination when the UIM is removed and inserted, and consequently may become unreliable with repeated use.

A second alternative means deals with the initial provisioning but not with subscription portability. This second means requires that, when the subscriber first buys a new telephone, the user dials a special number to reach a customer service representative who can determine the credit of the user and can then program the necessary subscription information into the terminal using over the air messages.

This second alternative means is an improvement over the UIM means in that it requires no special interface in the terminal. This second means, however, is also not entirely satisfactory, because the service provider must still have highly skilled personnel in the customer service center to operate the over-the-air programming equipment. The expensive nature of the customer service process prohibits the subscriber from re-registering a telephone which a friend has loaned to him for a day or two.

The purpose of this invention is to provide a method for initial provisioning and subscription portability that does not require skilled personnel to complete the provisioning and registration process, nor a removable item that the user must physically insert into the terminal.

The procedure described herein requires only that the subscriber enter his/her portable wireless subscription identifier, or user identifier (conventionally, his International Mobile User Identifier, or IMUI) and a password (conventionally, his Personal Identification Number, or PIN) into a wireless terminal. The password may be entered into the terminal in any convenient manner, such as keying a number into a keypad, speaking a phrase (with suitable voice recognition technology) into the microphone, or any other convenient manner. The wireless terminal is then able to contact the service provider using over-the-air signals, obtain necessary subscription information, and automatically reprogram itself—and reprogram the service provider—so that the service provider thereafter recognizes this wireless terminal as being registered to this subscriber. The password must be fairly short—typically four to six digits, as in bank card PINs—because the average subscriber cannot memorize a security code that is sufficiently long (twenty digits or more) to impede a brute-force attack.

It is evident that the password must be protected from compromise during the registration process, otherwise the subscription information would be subject to cloning by fraudulent users who obtain the user identifier and password. Recent advances in cryptography, such as the work of Bellovin and Merritt, cited below, provide techniques for securely verifying that the terminal and wireless network both know the correct password without revealing the password. These techniques also provide means for establishing encryption keys that can be used in the encryption of subscription information exchanged subsequent to the initial password confirmation. The existence of these techniques makes it possible to support registration for initial provisioning and subscription portability without need for removable nor for customer service intervention.

BRIEF DISCLOSURE OF THE INVENTION

Applicant has developed a subscription which is truly portable from one wireless terminal to another, and which uses passwords which are both short and secure.

Whenever a subscriber wishes to register a terminal to his subscription, he enters his user identifier (conventionally, his International Mobile User Identifier, or IMUI) and his password (conventionally, his Personal Identiication Number, or PIN) into the terminal. The terminal generates a public/private key pair and stores it. This key pair is preferably a Diffie-Hellman (D-H) key pair. It optionally concatenates the public key with a random number, and encrypts the (optionally concatenated) number with the password. Any convenient Secure Key Exchange (SKE) method may be used. Several suitable SKE methods are described in Thomas Wu,"The Secure Remote Password Protocol," *Proc. 1998 Internet Society Network and Distributed System Security Symposium*, San Diego, Calif., March 1998, pp. 97–111, http://jafar.stanford.edu/srp/ndss.html, and in David P. Jablon, "Strong Password-Only Authenticated Key Exchange," of Integrity Sciences, Inc., of Westboro, Mass., USA, Mar. 2, 1997, http://world.std.com/~dpj/speke97.html, the disclosures of which are incorporated herein by reference. The Diffie-Hellman Encrypted Key Exchange (DH-EKE) method of Bellovin and Merritt is particularly suitable, and the remaining description of the present invention is made with reference to DH-EKE. See Steven M. Bellovin and Michael Merritt, "Encrypted Key Exchange: Password-Based Protocols Secure Against Dictionary Attacks," in *Proc. IEEE Computer Society Symposium on Research in Security and Privacy*, pp. 72–84, May 1992, the disclosure of which is incorporated herein by reference. Either elliptic curve or exponential groups can be used with this method. The resulting encrypted message is called the DH-EKE message.

The terminal then makes wireless contact with a local serving system and requests registration. This serving system may be the subscriber's home system, but often it is not. In any event, the terminal and the home system must be assured of each other's identities, whether there is no intermediate serving system, one system, or even several. The remainder of this description assumes one intermediate system, but is readily modified to handle none or several. That is, the terminal and the home system will always be the source and destination (or vice versa) of messages, regardless of how many intermediate systems (if any) they have to pass through.

The terminal tells the serving system what the subscriber's home system is, by stating either the full user identifier or enough of the user identifier as is necessary to identify the home system. It also states the DH-EKE message. Preferably, the serving system first provides its D-H public key to the terminal, so that the specifics of who is requesting registration are not sent in the clear. Also preferably, the serving system opens a channel with the terminal to facilitate the registration process.

The serving system sends the DH-EKE message to the home system, which decrypts it with the password. The password is known only to the home system and the subscriber. The home system thereby recovers the subscriber's public key. The home system generates its own D-H public/private key pair and stores it. It then concatenates the newly generated public key with a random number, encrypts the concatenated number with the password using DH-EKE, and transmits this newly generated DH-EKE message back to the terminal. The terminal decrypts it with the password and recovers the home-system public key.

The terminal and the home system are now each in possession of its own private key and the other's public key, both of which are far larger than the password. Each is thus able to generate a common session key using conventional methods. Each is further able to securely use the session key to download a Virtual User Identification Module (VUIM) into the terminal, that is, to provide to the terminal, over the air, some or all of the information which otherwise would be obtained from a Physical UIM (PUIM) being inserted into the terminal.

Registration may now continue in the conventional fashion, as though a PUIM had been used. Alternatively, registration may be included within the downloading process. This is possible since a terminal with a VUIM already has something which a terminal with a PUIM does not acquire until later, namely, a communications link to (and a shared secret session key with) the home system.

A strength of this method is that the public keys are temporary, and can be replaced on each subsequent registration. Further, each public key is essentially a random number, providing no indication whether an attempted decryption was or was not successful. An off-line dictionary attack therefore fails. The only thing that a dictionary attacker recovers is a collection of possible public keys, none of which has anything to distinguish it from any of the others. There is thus nothing to distinguish a correct guess of the password from an incorrect guess. The follow-on on-line attack must therefore still use the entire dictionary of passwords, and will therefore fail.

This strength may also be viewed as the password being used as a private key in a key exchange procedure, rather than as an encryption key per se. It is for this reason that the process is called Secure Key Exchange rather than Encrypted Key Exchange. It is not necessary that the terminal and home system exchange passwords nor session keys in encrypted form. What is important is that the home system be assured that the terminal knows the password and has the common session key. It is also important that the password not be discoverable by eavesdroppers while the terminal is demonstrating its identity to the home system. If the password is not included in the message, even in encrypted form, then it is more difficult to be compromised.

DETAILED DESCRIPTION

Figure 1:
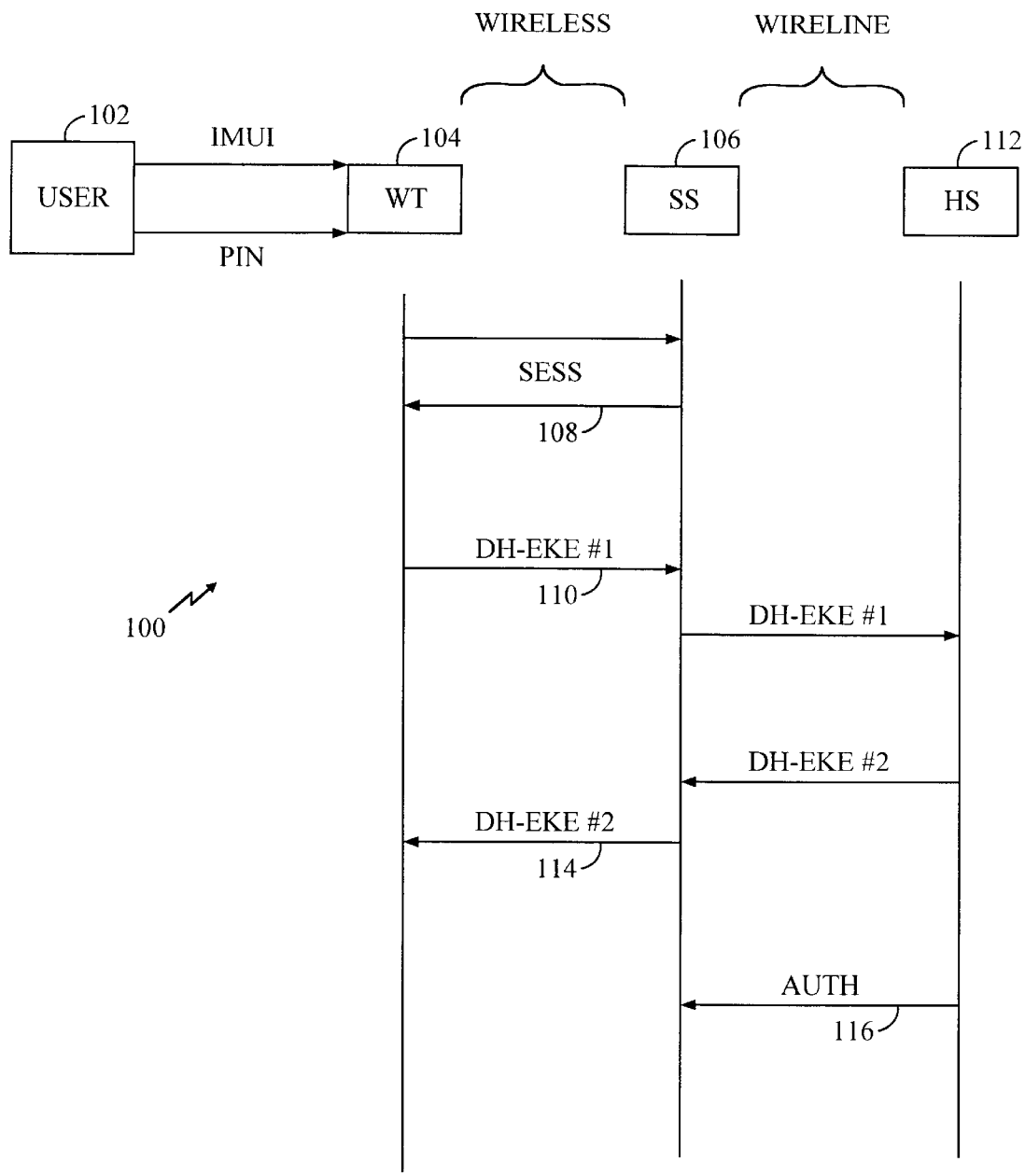
FIG. 1 shows an exchange of DH-EKE messages.

FIG. 1 shows an exchange 100 of DH-EKE messages. The user 102 enters the user identifier and password into the wireless terminal 104. The terminal 104 generates a pair of Diffie-Hellman (D-H) private and public keys, and stores them. Optionally, the terminal 104 and the base station of the serving system 106 carry out a separate procedure to establish a local session encryption key SESS 108 to protect the user identifier from interception. The terminal 104 uses the password to encrypt the D-H public key, optionally concatenated with a random number before encryption, then transmits the user identifier (optionally encrypted under the local session key) and the encrypted public key, that is, a first DH-EKE message 110, to the base station of the serving system 106 in a registration request. This request should result in a dedicated channel assignment in order to complete the download procedure efficiently.

The serving system 106 contacts the home system 112 requesting a subscription registration. The home system 112 decrypts the wireless terminal's public key using the password in the subscription record. The home system then creates a private and public D-H key, from which a tentative session key is obtained using the terminal's public key and the home system's private key. The home system then encrypts its own public key, optionally concatenating a random number before encryption, using the password stored in the subscription record and returns it in the form of a second DH-EKE message 114 to the wireless terminal 104 via the serving system 106. The wireless terminal 104 decrypts the home system's public key and creates (hopefully) the same tentative session key, using the home system's public key and its own private key.

Figure 2:
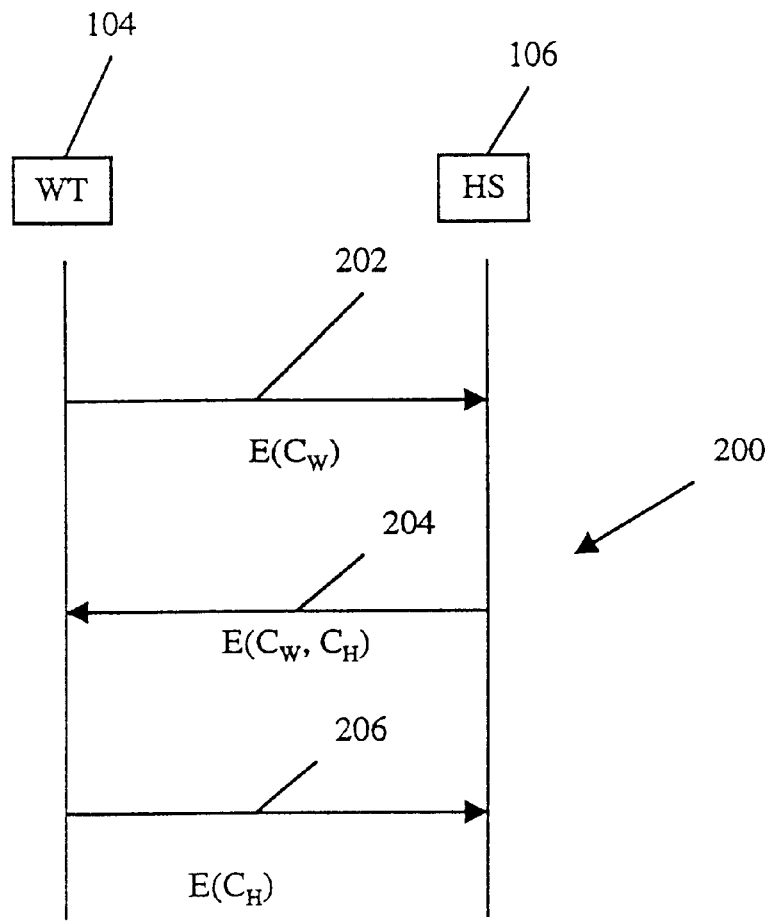
FIG. 2 shows an authentication procedure.

FIG. 2 shows an authentication procedure 200 which must follow the DH-EKE exchange. The wireless terminal 104 and home system 112 carry out this procedure to prove that each have the same key. This authentication could be either unilateral (for example, only allowing the home system 112 to authenticate the wireless terminal 104) or bilateral. The bilateral technique has three steps. First, the wireless terminal 104 encrypts a random number $C_W$ and sends the encrypted number $E(C_W)$ 202 to the home system 112. Second, the home system 112 generates its own random number $C_H$, encrypts $(C_W, C_H)$ and sends the encrypted number $E(C_W, C_H)$ 204 to the wireless terminal 104. Third, the wireless terminal 104 encrypts $C_H$ and sends the encrypted number $E(C_H)$ 206 to the home system 112. A unilateral procedure could, for example, omit the first step, and replace $C_W$ in the second step by a second random number.

The public keys were encrypted by the password, and the authentication consists of three different things being sent in an interlocked manner. Therefore, a man-in-the-middle attacker cannot cause a false acceptance of keys, and cannot know the mutual key without breaking the discrete logarithm or elliptic-curve group. Such breakage is currently considered infeasible if the group size is sufficiently large.

If the home system 112 verifies the session key of the wireless terminal 104, it will transfer the subscription information—that is, all or part of a virtual UIM (VUIM)— to the serving system 106, in both encrypted form for over-the-air transmission and in unencrypted form for use by the serving system. The session key—or, at least, a first portion of it—can also serve as an authentication key AUTH 116 for subsequent authentications of the terminal 104 in the serving system 106. This has advantages over the current cellular authentication procedures in that the authentication key is created at each registration, and therefore will change randomly from registration to registration. Typically the D-H exchange produces 512 bits of output, which is more than are needed for authentication. As a result, the remainder of the session key, that is, a second portion of it, can serve as a conventional encryption key for subsequent control signal transmissions.

The serving system 106 downloads the encrypted subscription data—the VUIM—to the terminal and makes a registration entry in the Visitor Location Register (VLR). The user is now ready to make calls.

For subsequent system accesses, the user can be assigned a Temporary Mobile User Identifier (TMUI) as described in existing cellular standards. The generation of per-call encryption keys can be carried out using the authentication key using procedures described in existing cellular standards. In other words, the airlink security procedures in existing cellular standards can be used without modification after the generation of the authentication key using the methods described here.

Industrial Application

My invention is capable of exploitation in industry, and can be made and used, whenever is it desired to register a wireless subscription in a new wireless terminal. The individual components of the apparatus and method shown herein, taken separate and apart from one another, may be entirely conventional, it being their combination which I claim as my invention.

While I have described various modes of apparatus and method, the true spirit and scope of my invention are not limited thereto, but are limited only by the following claims and their equivalents, and I claim such as my invention.

What is claimed is:

1. A method for providing secure and automatic initial provisioning and/or subscription portability of a wireless terminal, the method comprising:
   receiving a wireless subscription identifier into the wireless terminal;
   receiving a password into the wireless terminal; and
   communicating over the air with a home system to complete initial provisioning and/or subscription portability.

2. The method of claim 1 further comprising generating a public/private key pair at the wireless terminal.

3. The method of claim 1 further comprising using the password to encrypt a public key according to a secure key exchange protocol, thereby forming a secure key exchange message at the wireless terminal.

4. The method of claim 1 further comprising transmitting the subscription identifier and a secure key exchange message from the wireless terminal to the home system.

5. The method of claim 1 further comprising receiving, at the wireless terminal, an encrypted public key from the home system.

6. The method of claim 1 further comprising using the password to decrypt an encrypted public key received from the home system at the wireless terminal.

7. The method of claim 1 further comprising using a wireless terminal's private key and a home system's public key to form a session key at the wireless terminal.

8. The method of claim 1 further comprising downloading, at the wireless terminal, all or part of a Virtual User Identification Module received from the home system to the wireless terminal.

9. The method of claim 8 further comprising using a session key to perform the downloading.

10. The method of claim 1 further comprising encrypting the subscription identifier at the wireless terminal before transmitting the subscription identifier to the home system.

11. A home system for secure and automatic initial provisioning and/or subscription portability of a wireless terminal configured to:
    receive a password and a subscription identifier from a wireless terminal; and
    communicate with the wireless terminal over the air to complete initial provisioning and/or subscription portability of the wireless device.

12. The home system of claim 11 further configured to generate a public/private key pair.

13. The home system of claim 11 further configured to receive a user identifier and an encrypted public key from a wireless terminal.

14. The home system of claim 11 further configured to use the subscription identifier to determine the password.

15. The home system of claim 11 further configured to use the password to encrypt a home system's public key according to a secure key exchange protocol, thereby forming a secure key exchange message.

16. The home system of claim 11 further configured to transmit a secure key exchange message.

17. The home system of claim 11 further configured to use the password to decrypt a wireless terminal's public key.

18. The home system of claim 11 further configured to use a private key and a wireless terminal's public key to form a session key.

19. The home system of claim 11 further configured to use a session key to download all or part of a Virtual User Identification Module from the home system to the wireless terminal.

20. A wireless terminal configured to securely and autonomously perform initial provisioning and/or subscription portability over the air.

21. A home system configured to securely and autonomously perform initial provisioning and/or subscription portability of a wireless terminal over the air.

* * * * *